Oct. 22, 1929.  L. LYNDON  1,732,609
ELECTRICAL DISTRIBUTION SYSTEM

Original Filed Oct. 17, 1923

INVENTOR
Lamar Lyndon
By his Attorney
Alexander Chessin

Patented Oct. 22, 1929

1,732,609

UNITED STATES PATENT OFFICE

LAMAR LYNDON, OF NEW YORK, N. Y.

ELECTRICAL DISTRIBUTION SYSTEM

Application filed October 17, 1923, Serial No. 669,013. Renewed March 9, 1929.

My invention relates to the control and regulation of electrical distribution systems supplied by a generator which is operated at irregular and intermittent speeds, such as those driven by car axles, motor-car engines, wind-mills, and other variably and intermittently rotating drives.

The object of this invention is to simplify the present methods so that the equipment required for such systems will be more reliable and give a better regulation than is possible under the systems now in use. Another object of the invention is to devise a system which involves cheaper construction and easier operation, as well as an equipment capable of better and cheaper maintenance. Other objects of my invention will be made manifest from the detailed specification.

In general, the invention comprises the use of an alternating current dynamo which delivers its current to translating devices through a circuit wherein is inserted an inductance. This inductance sets up a counter electromotive force which, for a given current flow, is directly proportional to the frequency and, therefore, to the speed of the dynamo. Hence, the increase, or decrease, in dynamo voltage, due to changes in speed, is exactly counteracted by the corresponding change in the counter electro-motive force set up by the inductance.

Figure 1:
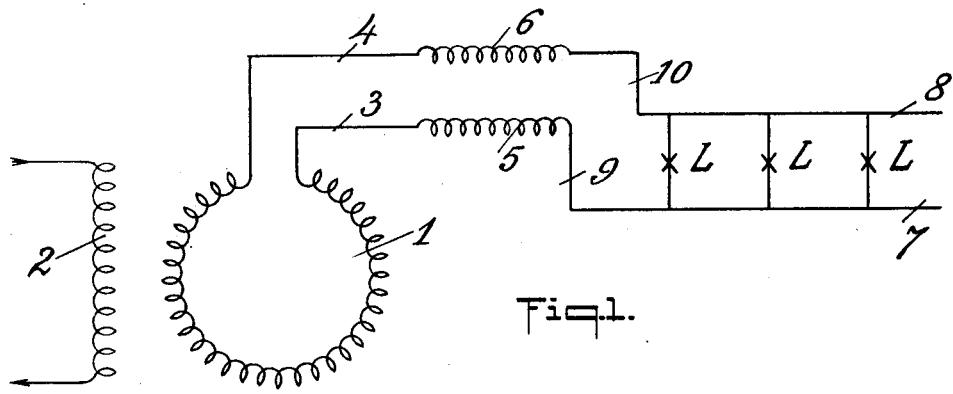

Figure 1 shows one form of my invention. In this figure, 1 is the armature of a dynamo, 2 is the field winding which receives current from a source of approximately constant potential, not shown. The leads 3 and 4 from the armature 1 connect with the inductances 5 and 6, which are in series with the armature circuit. The work circuit is formed by the two conductors 7 and 8, across which are translating devices L, L, L, . . . The wire 9 joins inductance 5 to the conductor 7 of the work circuit, while the wire 10 connects inductance 6 with the conductor 8. By this arrangement, the dynamo armature is connected to the work circuit with the inductances in series therewith.

Figure 2:
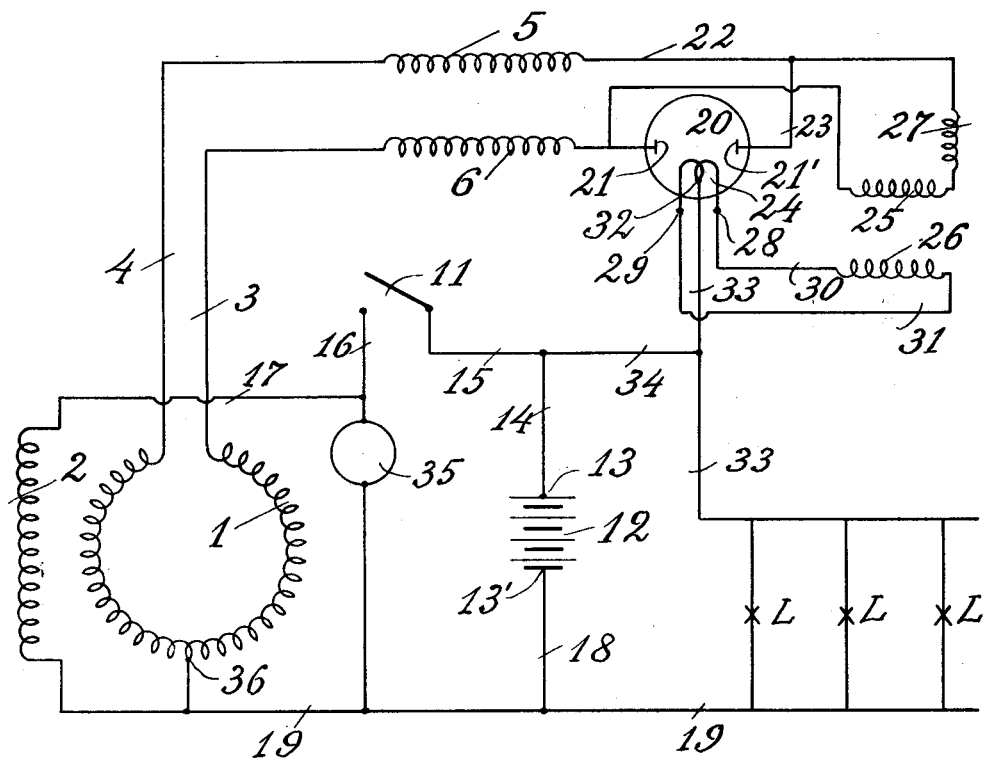

Figure 2 shows another form of my invention, as applied to lighting and to charging storage batteries on motor-cars and railway trains. As in Figure 1, 1 is the armature, 2 the field winding, 3 and 4 the leads from the armature 1, 5 and 6 the inductances. A switch, 11, connects the field 2 to a storage battery 12, the path being from the positive battery pole 13, by wires 14, 15, to switch 11; thence, by wires 16 and 17 to one terminal of the field winding 2. The other terminal of the field winding 2 is connected to the negative pole 13' of the battery 12, by wires 18, 19. In this diagram, 35 is any translating device which it is desired to connect to the battery 12 at the same time that the field winding 2 is switched in circuit, such as, for example, a timing mechanism for internal combustion engines. The system includes a static rectifier of alternating current, a hot filament type of such rectifier, 20, being shown in this diagram. The armature lead 3 passes from the armature 1 to the inductance 6 and, thence, to the terminal 21 of the rectifier 20, while the armature lead 4 goes from armature 1 to inductance 5 and, thence, by wires 22, 23, to terminal 21' of the rectifier 20.

The filament 24 of the rectifier 20 is heated by current from any convenient source which is not in electrical connection with the circuits carrying current to be rectified, such a source being shown in Figure 2 in the form of a small transformer, of which 25 is the primary, and 26 the secondary. The primary 25 receives alternating current from the armature of the dynamo, an inductance 27 being connected in series with the primary circuit so that its counter electro-motive force opposes flow of current through the primary transformer winding. This opposition to flow varies in exact proportion to the frequency and, therefore, to the speed of the dynamo. The secondary winding 26 is connected to the terminals 28, 29 of the filament through wires 30, 31, respectively. Connected to the filament at point 32 is the wire 33, which completes the path to the positive pole 13 of the battery 12 through wires 34, 14. As shown, wire 33 forms one element of the work circuit. The other element 19 of the work circuit, through wire 18, connects with the negative pole 13' of the battery 12, so that the work circuit is always connected to the battery and will receive current for the translating devices L, L, . . . , continuously, whether the dynamo is running, or not, provided, of course, that the individual switches (not shown) of the translating devices are turned on. It is a property of the hot filament rectifier that the hotter the filament the less is the voltage drop in the current passing through the rectifier. Hence, the greater the current in the filament, the less is the voltage drop in the rectifier and the greater the voltage delivered to the battery circuit.

The operation of the system will now be briefly described.

In the system illustrated in Figure 1, current is supplied to the field 2 from any convenient source of uni-directional current, which magnetizes the magnetic system of the dynamo. When the rotor of the machine is turned by some outside source of power, an alternating current is induced in the dynamo armature 1, which current flows to the work circuit over the wires and through the inductances shown in the diagram. The passage of the current through the inductances sets up a counter electro-motive force opposing the flow of current from the dynamo, so that the flow is limited by the impedance of the system for any given dynamo voltage. As is well known in the art, the counter electromotive force due to the inductance in a circuit is exactly proportional to the frequency and, therefore, to the speed of the dynamo. Hence, as the speed of the dynamo increases, producing a corresponding increase in the voltage, this voltage increase is opposed by a voltage in the inductance which increases in the same proportion. Hence, if the current from the dynamo is approximately constant, the voltage between the conductors of the work circuit will also be approximately constant, regardless of the variations in speed, within the predetermined limits of design of the apparatus.

In the system illustrated in Figure 2, the switch 11 is closed to send current from the battery to the field winding, thereby exciting the dynamo. If the speed of the dynamo is insufficient to generate a voltage somewhat in excess of the battery voltage, the translating devices will receive current only from the battery. As the speed increases, the dynamo voltage will reach a value which exceeds that of the battery, and current will flow alternately from the terminals 21, 21', of the rectifier 20, to the filament 24, the latter being heated by the current from the secondary of the transformer 25, 26. The current flow from the armature to the negative side of the system proceeds from the tap 36, connected to the middle point of the armature winding. As shown, this middle tap is connected to wire 19. The current flow to the positive side of the system is alternately from terminals 21 and 21' to the filament 24 and thence by wire 33 to the positive pole 13 of the battery and positive side of the work circuit. As the speed of the dynamo increases, the voltage increases in direct proportion, and this tends to send more current to the battery and translating devices. This increase, however, can not occur because of the increase in the counter electro-motive force of the inductances, which also increases in direct proportion with the speed. Furthermore, any increase in current through the inductive circuit will set up a still higher counter electro-motive force to oppose flow from the dynamo, so that the current will remain substantially constant for any changes in dynamo speed. All this assumes that the current supplied to the filament of the rectifier is constant. It may be, however, that, under certain conditions, a slight reduction of current flow from the dynamo to the main circuit is desirable with increase in speed. In that case, this would be accomplished by the inductance 27 in the circuit of the primary 25 of the transformer 25, 26. Since the leads to the primary are tapped into the main circuit at points where the main inductances are between the taps and the dynamo, the voltage at the tap points does not increase to any substantial degree with the increase in speed. The counter electro-motive force of the inductance 27 increases in direct proportion to the increase in speed, so that the condition is that of a substantially constant voltage opposed by one which rises with dynamo speed. Hence, the net voltage to cause current flow through the primary of the transformer constantly diminishes with speed increase, which, in turn, reduces the current supplied to the filament of the rectifier. This results in a greater voltage drop through the rectifier, so that speed increase is accompanied by a reduced voltage to the work circuit and, hence, a lesser current flow to it and to the battery.

While I have shown and described, and have pointed out in the annexed claims, certain novel features of my invention, it will be understood that various omissions, substitutions and changes in the form and details of the invention as illustrated and in its operation, and the great many variants and equivalents of which the invention is capable without departing from its general scope, purpose and arrangement, may be made by those skilled in the art without affecting the spirit of the invention.

Having fully described my invention, I claim:

1. In a system of electrical distribution, an alternating current dynamo driven at varying and intermittent speeds, a static rectifier comprising a filament adapted to be electrically heated, means for supplying energy from said dynamo to heat said filament, means for controlling said energy responsive to changes in the speed of said dynamo, a storage battery, a work circuit, means for supplying current from said dynamo to said battery and to said work circuit through said rectifier, and a reactance in the path of the current from said dynamo to said rectifier.

2. In a system of electrical distribution, an alternating current dynamo driven at varying and intermittent speeds, a static rectifier comprising a filament, a transformer, means for supplying current from said dynamo to the primary of said transformer, means for supplying energy from the secondary of said transformer to heat said filament, a storage battery connected to the field of said dynamo, a work circuit, means for supplying current from said dynamo to said battery and to said work circuit through said rectifier, a reactance in the path of the current from said dynamo to said rectifier, and means for controlling the current in the circuits of said transformer responsive to current frequency.

3. In a system of electrical distribution, an alternating current dynamo driven at varying and intermittent speeds, a storage battery, a rectifier, means for charging said storage battery by said dynamo through said rectifier, a reactance in the path of the current from said dynamo to said rectifier, and means for controlling the rectified current responsive to changes in speed of said dynamo.

4. In a system of electrical distribution, an alternating current dynamo driven at varying speed, a work circuit, a rectifier, means for supplying current to said work circuit from said dynamo through said rectifier, and means for controlling the rectified current responsive to changes in speed of said dynamo.

5. The combination with an alternating current dynamo driven at varying speed, of a source of unidirectional current, a work circuit, a rectifier, means for supplying current to said work circuit from said dynamo through said rectifier or from said source of unidirectional current, means for controlling the current from said dynamo to said rectifier responsive to current frequency, and means for controlling the rectified current responsive to changes in speed of said dynamo.

6. In a system of electrical distribution, an alternating current dynamo driven at varying and intermittent speeds, a storage battery, means for supplying current from said battery to the field of said dynamo, a rectifier, a work circuit, means for supplying current from said dynamo to said storage battery and to said work circuit through said rectifier, a reactance in the path of the current from said dynamo to said rectifier, and means for controlling the rectified current responsive to changes in speed of said dynamo.

7. In a system of electrical distribution, an alternating current dynamo driven at varying and intermittent speeds, a static rectifier comprising a filament, a transformer, the leads to the primary of said transformer being tapped into the armature circuit of said dynamo and the leads of the secondary being connected to the terminals of said filament, a storage battery connected to the field of said dynamo, a work circuit, means for supplying current from said dynamo to said battery and said work circuit through said rectifier, a reactance in said armature circuit between said dynamo and the points where the leads of the primary of said transformer are tapped into said armature circuit, and a reactance in the circuits of said transformer.

LAMAR LYNDON.